United States Patent
Youn et al.

(10) Patent No.: US 7,284,253 B2
(45) Date of Patent: Oct. 16, 2007

(54) OPTICAL PICKUP TRANSFERRING APPARATUS OF AN OPTICAL DISK DRIVE

(75) Inventors: Jae-hyun Youn, Suwon-si (KR); Un-jin Choi, Suwon-si (KR)

(73) Assignee: Samsung Electroncis Co., Ltd., Suwon-Si (KR)

( * ) Notice: Subject to any disclaimer, the term of this patent is extended or adjusted under 35 U.S.C. 154(b) by 409 days.

(21) Appl. No.: 10/839,341

(22) Filed: May 6, 2004

(65) Prior Publication Data

US 2004/0223422 A1 Nov. 11, 2004

(30) Foreign Application Priority Data

May 6, 2003 (KR) .................. 10-2003-0028598

(51) Int. Cl.
- *G11B 7/08* (2006.01)
- *G11B 7/09* (2006.01)
- *G11B 7/085* (2006.01)

(52) U.S. Cl. .................. 720/676; 720/677; 720/678
(58) Field of Classification Search ......... 720/676–678
See application file for complete search history.

(56) References Cited

U.S. PATENT DOCUMENTS

| | | | |
|---|---|---|---|
| 6,052,358 A * | 4/2000 | Morikawa et al. ......... | 720/663 |
| 6,058,098 A * | 5/2000 | Kato ......................... | 720/663 |
| 6,373,812 B2 * | 4/2002 | Kim et al. ................ | 720/675 |
| 2003/0174636 A1 * | 9/2003 | Feinberg et al. ........... | 369/249 |
| 2005/0034142 A1 * | 2/2005 | Park et al. .................. | 720/676 |

FOREIGN PATENT DOCUMENTS

| | | | |
|---|---|---|---|
| JP | 8-138333 | | 5/1996 |
| JP | 8-249838 | | 9/1996 |
| JP | 09007319 A | * | 1/1997 |
| JP | 2002-279739 | | 9/2002 |

OTHER PUBLICATIONS

English Machine Translation of JP 08-249838, Sony Corp., Yasuhiro Habara.*
English Machine Translation of JP 2002-279739, Matsushita Electric Ind.Co LTD., Yoshiyyuki Fujii.*

* cited by examiner

*Primary Examiner*—Angel Castro
*Assistant Examiner*—Christopher R. Magee
(74) *Attorney, Agent, or Firm*—Staas & Halsey LLP

(57) ABSTRACT

An optical pickup transferring apparatus including a slider having a base, a floating portion elastically coupled to the base, the floating portion having on one side thereof at least one protuberance inserted into the external thread of a lead screw, and an elastic element located on the top of the base and the floating portion. The elastic element includes a first elastic portion to push the floating portion toward the lead screw so that the protuberance is inserted into the external thread, and a second elastic portion to push the floating portion toward the screw groove to thereby prevent the protuberance from escaping from the external thread when the floating portion is transformed elastically.

15 Claims, 5 Drawing Sheets

OPTICAL PICKUP TRANSFERRING APPARATUS OF AN OPTICAL DISK DRIVE

CROSS-REFERENCE TO RELATED APPLICATIONS

This application claims the priority of Korean Patent Application No. 2003-28598, filed on May 6, 2003, in the Korean Intellectual Property Office, the disclosure of which is incorporated herein in its entirety by reference.

BACKGROUND OF THE INVENTION

1. Field of the Invention

The present invention relates to an optical pickup transferring apparatus and, more particularly, to an optical pickup transferring apparatus of an optical disk drive with an improved slider which supports an optical pickup.

2. Description of the Related Art

Generally, an optical disk drive to write information on and read information from an optical disk such as a compact disk (CD) and a digital versatile disk (DVD) includes a sub-chassis assembly which has an optical pickup to emit a beam onto the optical disk and then to collect light reflected therefrom in order to write or read information.

FIG. 1 is a plan view of an example of a conventional sub-chassis assembly of an optical disk drive. FIG. 2 is a perspective view of the slider of a conventional sub-chassis assembly shown in FIG. 1.

Referring to FIG. 1, a sub-chassis assembly 100 comprises a sub-chassis 101, a turntable 110 to accommodate an optical disk 103 which is rotated by a spindle motor (not shown), an optical pickup 120 to write and read information on and from the optical disk 103, and an optical pickup transferring apparatus to rectilinearly shift the optical pickup 120 in a radial direction of the optical disk 103.

The optical pickup transferring apparatus comprises a pair of guide rails 141 and 142 to allow the optical pickup 120 to move rectilinearly in a radial direction of the optical disk 103, a lead screw 151 installed in parallel with the guide rails 141 and 142 and having an external thread 152, a driving motor 150 to rotate the lead screw 151, and a slider 160 mounted on the lead screw 151 and performing motion along the lead screw 151 in accordance with the rotation of the lead screw 151 in order to rectilinearly move the optical pickup 120 in a radial direction of the radius of the optical disk 103.

The slider 160 comprises a base 161, a support 163, a floating portion 165, and a spring 169, as shown in FIG. 2.

The base 161 is connected to the optical pickup 120. The floating portion 165, coupled to the support 163, has two protuberances 167 inserted into the external thread 152 of the lead screw 151. The support 163 is integrally coupled with the floating portion 165 which thereby supportably approaches or departs from the base 161. The spring 169 is installed between the support 163 and the floating portion 165 so as to elastically bias the floating portion 165 toward the lead screw 151 with respect to the base 161.

When the lead screw 151 is rotated by the driving motor 150, the slider 160 rectilinearly shifts the optical pickup 120 in a radial direction of the radius of the optical disk 103 by the protuberances 167 inserted into the external thread 152 of the lead screw 151.

In the conventional optical pickup transferring apparatus constructed as above, if the driving motor 150 is rotated abruptly, the floating portion 165 is drifted suddenly toward the base 161 so that the protuberances 167 may escape from the external thread 152 of the lead screw 151. This effect mainly happens when the distance between the external thread 152 and the protuberances 167 becomes wider over time because of wear. Such a result may be further aggravated when the elasticity of the spring 169 weakens.

When the protuberances 167 of the slider 160 escape from the external thread 152, the slider 160 slips on the lead screw 151, which causes difficulty in configuring the firmware contained in the optical disk drive to accurately control the position and intensity of a laser beam to write and read information on and from the optical disk 103. If the strength of the spring 169 is reinforced, the protuberances 167 may be prevented from escaping from the external thread 152. However, this increases the friction between the external thread 152 and the protuberances 167 thereby causing the lead screw 151 to not rotate smoothly.

In addition to the fact that the optical pickup 120 is difficult to accurately control, the spring 169 simply pushes the floating portion 165 toward the lead screw 151 and thereby causes the protuberances 167 to be inserted into the external thread 151. Therefore, accounting of the contact load between the protuberances 167 and the external thread 152 during the servo control of the optical disk drive is difficult.

SUMMARY OF THE INVENTION

The present invention provides an optical pickup transferring apparatus with an improved structure in which a contact force between a slider and a lead screw is doubly controlled to thereby reduce a contact load, and to prevent the slider from separating from the lead screw, to efficiently control the motion of the optical pickup.

According to an aspect of the present invention, an optical pickup transfer apparatus comprises a lead screw having an external thread, and a slider, coupled with the optical pickup, to rectilinearly move the optical pickup in a radial direction of the optical disk in accordance with a rotation of the lead screw, wherein the slider includes a base, a floating portion elastically coupled to the base, having on one side thereof at least one protuberance inserted into the external thread of the lead screw, and an elastic element located on top of the base and the floating portion.

According to another aspect of the present invention, the elastic element comprises a first elastic portion to push the floating portion toward the lead screw so that the protuberance is inserted into the external thread; and a second elastic portion to push the floating portion toward the external thread to thereby prevent the protuberance from escaping from the external thread when the floating portion is transformed elastically.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
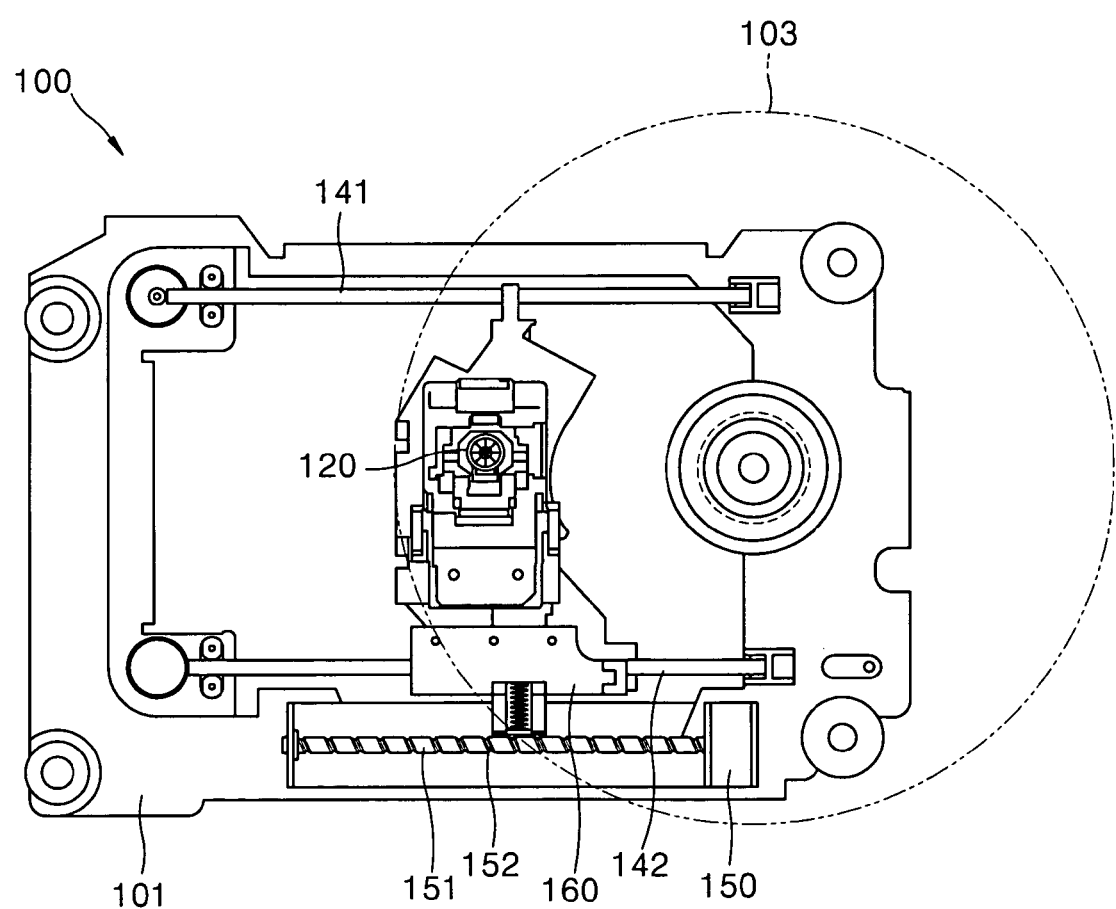
FIG. 1 is a plan view of one example of a conventional sub-chassis assembly.
Figure 2:
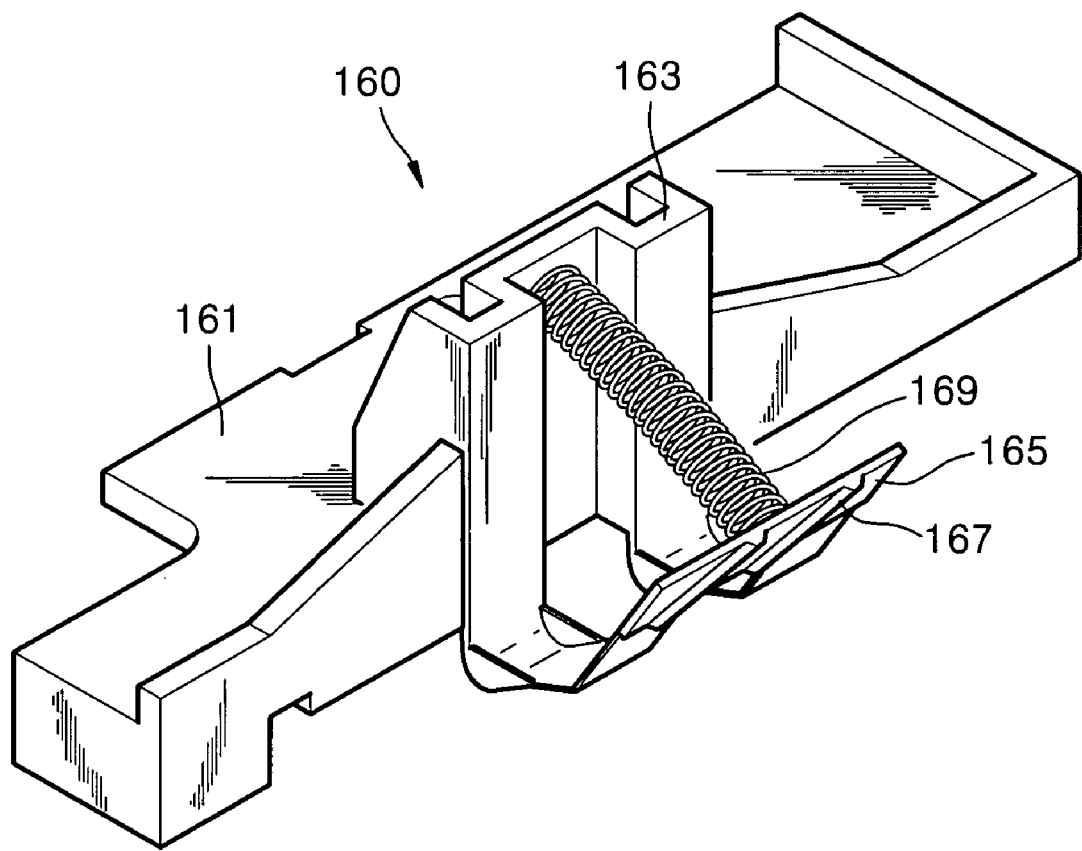
FIG. 2 is a perspective view of the slider of the conventional sub-chassis assembly shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
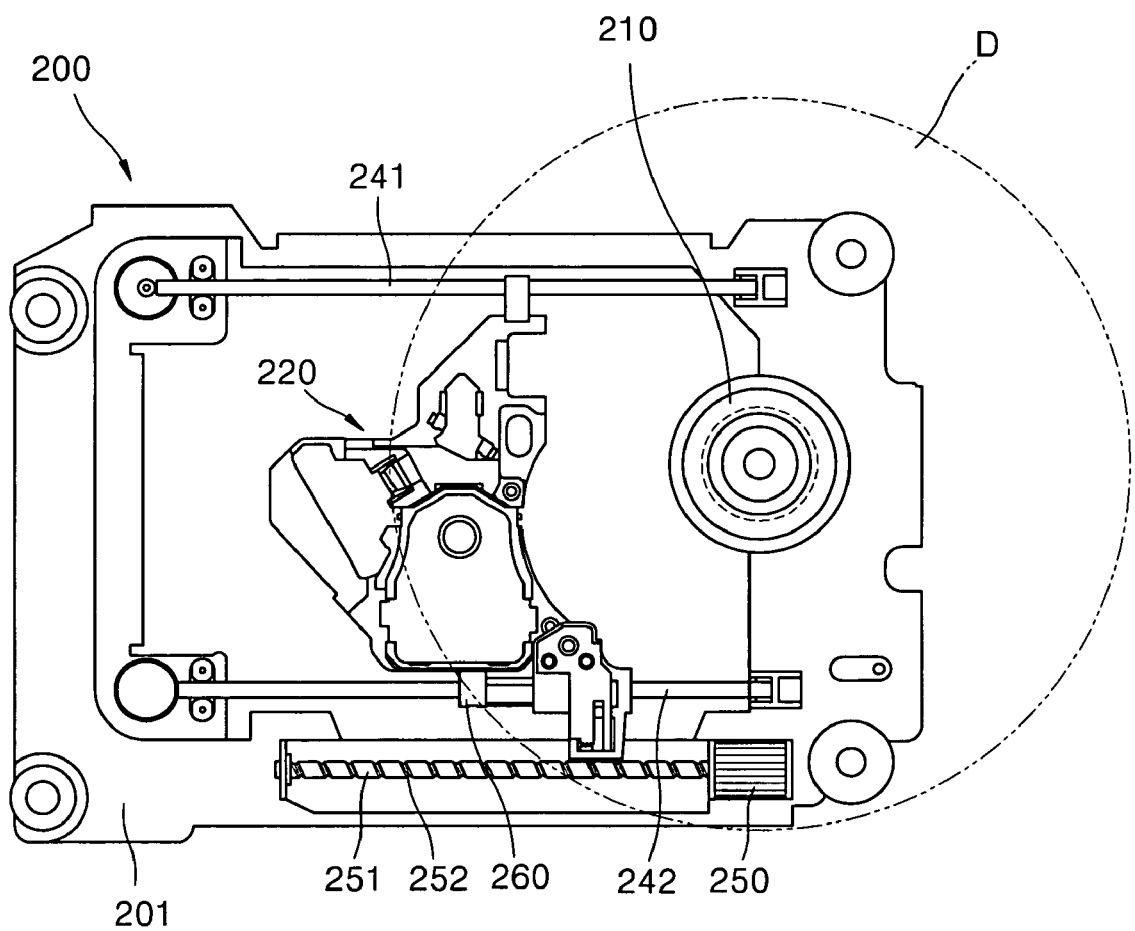
FIG. 3 is a plan view of one embodiment of a sub-chassis assembly having an optical pickup transferring apparatus according to an embodiment of the present invention.
Figure 4:
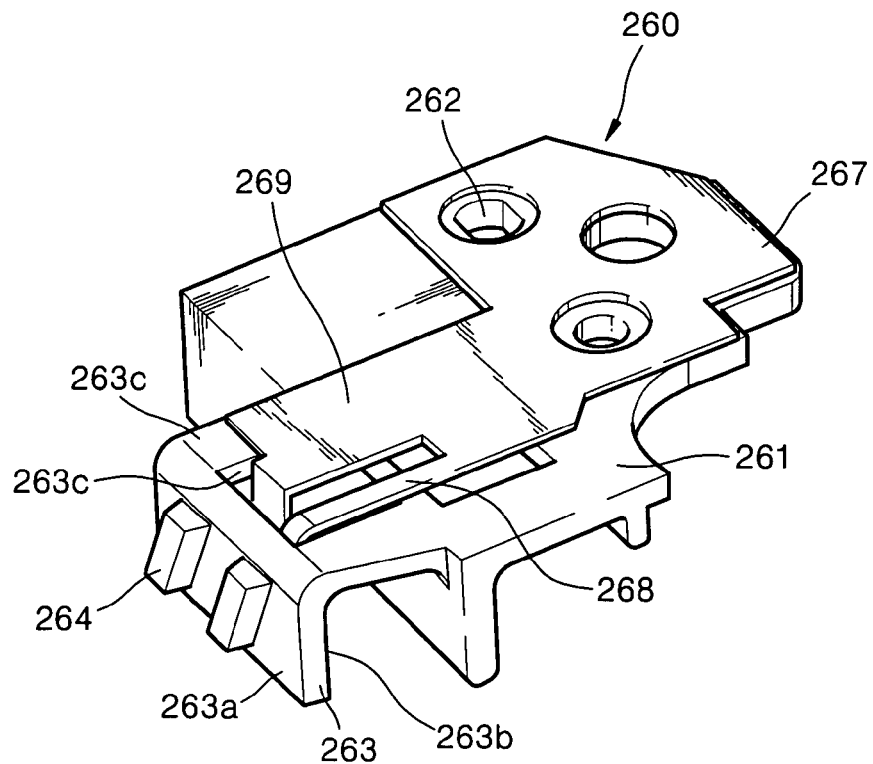
FIG. 4 is a perspective view of the slider shown in FIG. 3.
Figure 5:
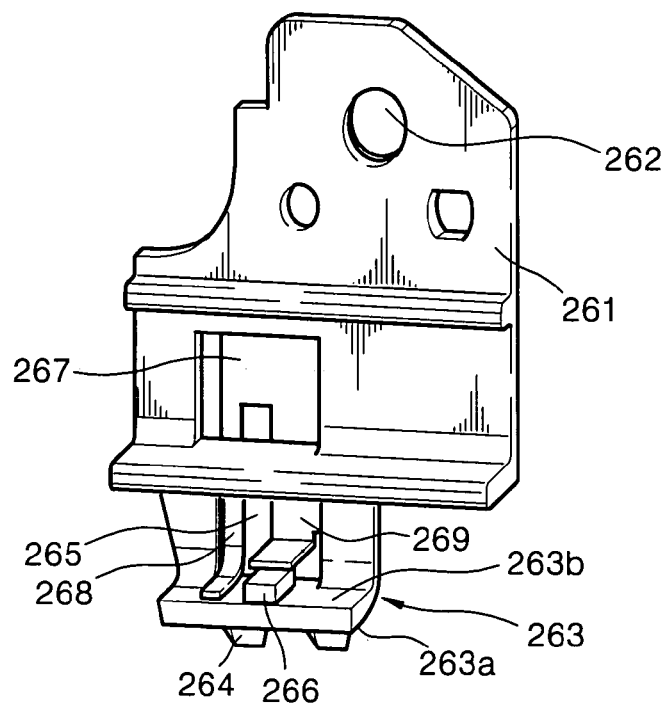
FIG. 5 is a rear view of the slider shown in FIG. 3.
Figure 6:
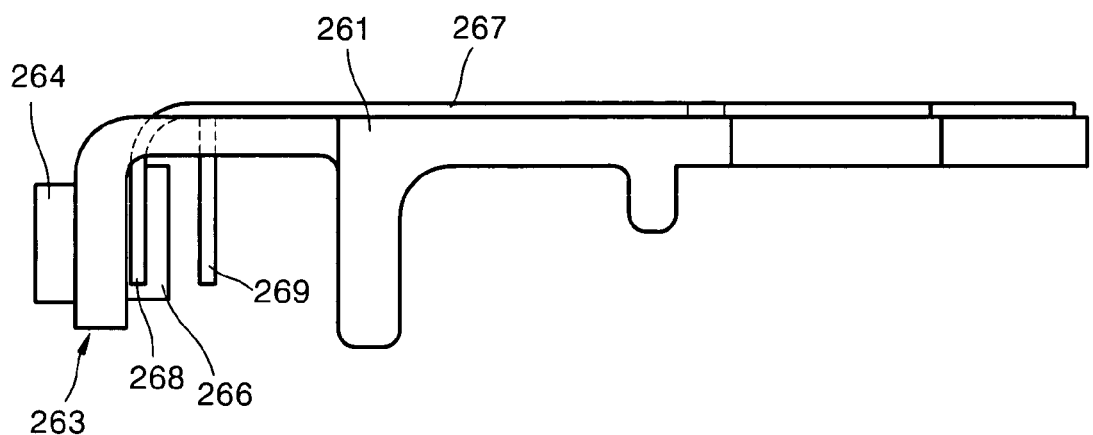
FIG. 6 is a front view of the slider shown in FIG. 3.
Figure 7:
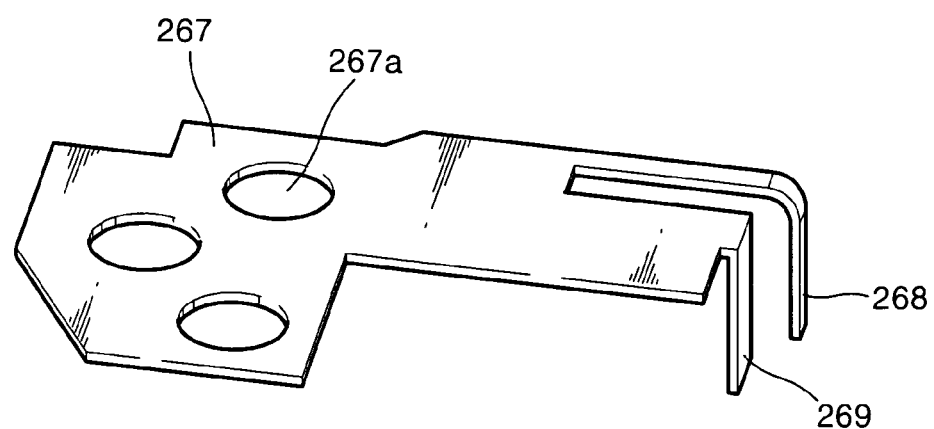
FIG. 7 is an enlarged perspective view of the elastic element of the slider shown in FIG. 4.

Referring to FIG. 3, a sub-chassis assembly according to an embodiment of the present invention comprises a sub-chassis 201, a spindle motor 210 to rotate an optical disk D, that is, an optical recording medium, an optical pickup 220 to emit light onto the optical disk D while rectilinearly shifting in a radial direction of the optical disk D, and to receive the light reflected therefrom in order to write and/or read information, and an optical pickup transferring apparatus to allow the optical pickup 220 to slide in the radial direction of the optical disk D.

The optical pickup transferring apparatus comprises a pair of guide rails 241 and 242 to allow the optical pickup 220 to rectilinearly move in the radial direction of the optical disk D, a lead screw 251 installed in parallel with the guide rails 241 and 242 and having an external thread 252, a driving motor 250 to rotate the lead screw 251, and a slider 260 to convert the rotation of the lead screw into rectilinear motion and to rectilinearly shift the optical pickup 220 in the radial direction of the optical disk D.

The slider 260 comprises a base 261, a floating portion 263, and an elastic element 267, as shown in FIGS. 4 through 7.

The base 261 is mounted on the optical pickup 220 and is fastened by a coupling element (not shown), through a plurality of piercing holes 262 formed through a side of the slider. In various embodiments of the invention, other fastening elements may be employed in mounting the base 261.

The floating portion 263 protrudes from one side of the base 261 and is elastically formed with a plurality of protuberances 264 provided aslant at a predetermined angle with one side 263a facing the lead screw 251. The protuberances 264 are inserted into the external thread 252 of the lead screw 251, and shift the optical pickup 220 in the radial direction of the disk D while sliding along the external thread 252 when the lead screw 251 is rotated.

On the top surface 263c of the floating portion 263, a slot 265 is formed where the elastic element 267 is positioned. On the other side 263b of the floating portion, i.e., the side facing the base 261 and opposite to the one side 263a where the protuberances 264 are formed, a bump 266 is protruded toward the base 261. The operation of the bump 266 will be explained later.

The elastic element 267 is located on the base 261 and the floating portion 263 and is fixed onto the base 261 by a fastening element (not shown) through a plurality of holes 267a formed on one side. The other side of the elastic element 267 has first and second elastic portions 268 and 269 on the top surface 263c of the floating portion at a predetermined interval. The elastic element 267 may be fixed to the base 261 in a variety of ways according to various embodiments of the invention. In this embodiment of the invention, the fastening element (not shown) includes holes 262 and 267a provided respectively in the base 261 and the elastic element 267.

The first elastic portion 268 is formed in the shape of a plate spring. The end of the first elastic portion 268 is bent to penetrate the slot 265 and then to make contact with the side 263b of the floating portion 263, which is opposite to the side from which the protuberances 264 protrude. The first elastic portion 268 has an elasticity which is sufficient to push the floating portion 263 toward the lead screw 251 and to thereby allow the protuberances 264 to be inserted into the external thread 252 of the lead screw 251.

The second elastic portion 269 is plate-spring shaped and therefore similar to the first elastic portion 268. The end of the second elastic portion 269 is also bent to penetrate the slot 265 and then to be spaced at a predetermined distance by the bump 266.

The second elastic portion 269 is wider than the first elastic portion 268 in order to enlarge the elasticity coefficient k of the second elastic portion 269 as compared to than that of the first elastic portion 268.

The distance between the second elastic portion 269 and the bump 266 prevents the floating portion 263 from receiving an excessive restraining force from the first and second elastic portions 268 and 269 when the first and second elastic portions 268 and 269 substantially simultaneously make contact with the floating portion 263. As a result, the first and second elastic portions 268 and 269 do not deteriorate or otherwise suffer damage over the lifetime of the apparatus. This arrangement facilitates the guiding of the optical pickup 220 (with reference to FIG. 3) in the direction of the radius of the disk D. The detachment of the protuberances 264 from the external thread 252 may be prevented by the second elastic portion 269 making contact with the bump 266 to hinder the floating portion 263 from being elastically deformed toward the base 261.

In this case, the distance between the second elastic portion 269 and the bump 266 is shorter than the depth the protuberances 264 are inserted into the external thread 252. This prevents the protuberances 264 from being detached from the external thread 252 as the bump 266 comes into contact with the second elastic portion 269.

The locations of the first and second elastic portions 268 and 269 are not confined to the embodiment depicted in FIGS. 4 through 7 but may have inverted positions.

Hereinafter, the operation of the optical pickup transferring apparatus according an embodiment of to the present invention will be described with reference to the attached drawings.

As shown in FIG. 3, after the slider 260 is installed in the optical pickup 220 with the protuberances 264 inserted into the external thread 252, the optical pickup 220 is moved in a radial direction of the disk D when the lead screw 251 is rotated by the this situation driving motor 250. In this situation, the first elastic portion 268 makes contact with the side 263a of the floating portion 263, which is opposite to the side from which the protrusions 264 protrude, to push the floating portion toward the lead screw 251 and thereby insert the protuberances 264 into the external thread 252.

When the protuberances 264 tend to escape from the external thread 252 due to an external force, the floating portion 263 is elastically deformed to drift toward the base 261. Accordingly, the floating portion 263 is prevented from drifting by the elastic nature of the second elastic portion 269 that makes contact with the bump 266.

As is described above, the optical pickup transferring apparatus of the present invention facilitates the control of the optical pickup by doubly controlling the contact force between the lead screw and the slider, as well as the prevention of the optical pickup from departing from the lead screw.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup transferring apparatus including a lead screw having an external thread, a slider coupled with a optical pickup to convert a rotation of the lead screw into rectilinear motion so as to rectilinearly shift the optical pickup in the direction of the radius of the optical disk, wherein the slider comprises:
    a base;
    a floating portion elastically coupled to the base and having on one side thereof at least one protuberance inserted into the external thread of the lead screw; and
    an elastic element; located on the top of the base and the floating portion, having a first elastic portion to push the floating portion toward the lead screw so that the protuberance is inserted into the external thread, and a second elastic portion, having an L shape, to push the floating portion toward the external thread to prevent the protuberance from escaping from the external thread,
    the L-shape comprising a first leg extending parallel to a direction of a pushing force of the second elastic portion on the floating portion and a second leg bent relative to the first leg and extending perpendicular to a direction of the pushing force of the second elastic portion on the floating portion.

2. The optical pickup transferring apparatus as claimed in claim 1, further comprising a hole formed on the top surface of the floating portion, wherein the first and second elastic portions are located in the hole formed on the top surface of the floating portion.

3. An optical pickup transferring apparatus including a lead screw having an external thread, a slider coupled with a optical pickup to convert a rotation of the lead screw into rectilinear motion so as to rectilinearly shift the optical pickup in the direction of the radius of the optical disk, wherein the slider comprises:
    a base;
    a floating portion elastically coupled to the base and having on one side thereof at least one protuberance inserted into the external thread of the lead screw; and
    an elastic element, located on the top of the base and the floating portion, having a first elastic portion to push the floating portion toward the lead screw so that the protuberance is inserted into the external thread, and a second elastic portion to push the floating portion toward the external thread to prevent the protuberance from escaping from the external thread,
    wherein the base comprises a bump, protruding toward the base, on the one side of the floating portion on which the protuberance is not formed.

4. The optical pickup transferring apparatus as claimed in claim 1, wherein the second elastic portion has a larger coefficient of elasticity than that of the first elastic portion.

5. The optical pickup transferring apparatus as claimed in claim 3, wherein the first elastic portion contacts with the floating portion, and the second elastic portion is spaced by a predetermined distance from the bump.

6. The optical pickup transferring apparatus as claimed in claim 3, wherein the distance between the second elastic portion and the bump is shorter than the length between the protuberance and the external thread.

7. A transferring apparatus including a screw having an external thread, and a slider to convert the rotation of the screw into rectilinear motion so as to rectilinearly slide, wherein the slider comprises:
    a base;
    a floating portion, having a first side facing the screw and a second side facing the base, elastically coupled with the base, having at least one protuberance, protruding from the first side, to cooperate with the external thread of the screw; and
    an elastic element, having a first elastic portion to push the floating portion toward the screw to insert the protuberance into the external thread, and a second elastic portion, having an L shape, to push the floating portion toward the screw to prevent the protuberance from escaping from the external thread when an external force is applied to the transferring apparatus which tends to cause the protuberance to be separated from the external thread,
    the L-shape comprising a first leg extending parallel to a direction of a pushing force of the second elastic portion on the floating portion and a second leg bent relative to the first leg and extending perpendicular to a direction of the pushing force of the second elastic portion on the floating portion.

8. A transferring apparatus including a screw having an external thread, and a slider to convert the rotation of the screw into rectilinear motion so as to rectilinearly slide, wherein the slider comprises:
    a base;
    a floating portion, having a first side facing the screw and a second side facing the base, elastically coupled with the base, having at least one protuberance, protruding from the first side, to cooperate with the external thread of the screw; and
    an elastic element, having a first elastic portion to push the floating portion toward the screw to insert the protuberance into the external thread, and a second elastic portion, having an L shape, to prevent the protuberance from escaping from the external thread when an external force is applied to the transferring apparatus which tends to cause the protuberance to be separated from the external thread, wherein the floating portion comprises:
    a slot, through which the elastic element partially extends, between the floating portion and the base; and
    a bump, on the second side of the floating portion, to protrude toward the base.

9. The transferring apparatus according to claim 8, wherein the first elastic portion is a plate spring including a bent end to penetrate the slot and to contact with the second side of the floating portion.

10. The transferring apparatus according to claim 9, wherein the first elastic portion has a coefficient of elasticity, which is sufficient to push the floating portion toward the screw.

11. The transferring apparatus according to claim 10, wherein the second elastic portion is a plate spring including a bent end to penetrate the slot and to be spaced from the bump.

12. The transferring apparatus according to claim 11, wherein the second elastic portion is wider than the first elastic portion such that the second elastic portion has a coefficient of elasticity which is greater than that of the first elastic portion.

13. The transferring apparatus according to claim 11, wherein the second elastic portion is separated from the bump by a distance which is sufficient to prevent the floating portion from escaping from the external thread of the screw.

14. The transferring apparatus according to claim 13, wherein the separation distance is shorter than the depth the protuberance is inserted into the external thread of the screw.

15. The transferring apparatus according to claim 7, wherein the elastic element is attached to a top of the base.

* * * * *

UNITED STATES PATENT AND TRADEMARK OFFICE
CERTIFICATE OF CORRECTION

PATENT NO. : 7,284,253 B2 Page 1 of 1
APPLICATION NO. : 10/839341
DATED : October 16, 2007
INVENTOR(S) : Jae-hyun Youn et al.

It is certified that error appears in the above-identified patent and that said Letters Patent is hereby corrected as shown below:

Title Page, Column 1 Item [73] (Assignee), Line 1, change "Electroncis" to --Electronics--.

Signed and Sealed this

Twenty Second Day of April, 2008

JON W. DUDAS
*Director of the United States Patent and Trademark Office*